United States Patent
Valery et al.

(10) Patent No.: US 10,870,895 B2
(45) Date of Patent: Dec. 22, 2020

(54) PURIFICATION METHOD USING A LOW GRANULOMETRY RESIN

(71) Applicant: Novasep Process, Pompey (FR)

(72) Inventors: Eric Valery, Saulxures-les-Nancy (FR); Cedric Prieur, Genas (FR)

(73) Assignee: Novasep Process, Pompey (FR)

( * ) Notice: Subject to any disclaimer, the term of this patent is extended or adjusted under 35 U.S.C. 154(b) by 0 days.

(21) Appl. No.: 16/346,324

(22) PCT Filed: Nov. 22, 2017

(86) PCT No.: PCT/FR2017/053218
§ 371 (c)(1),
(2) Date: Apr. 30, 2019

(87) PCT Pub. No.: WO2018/096272
PCT Pub. Date: May 31, 2018

(65) Prior Publication Data
US 2019/0300973 A1    Oct. 3, 2019

(30) Foreign Application Priority Data
Nov. 24, 2016    (FR) ...................................... 16 61476

(51) Int. Cl.
*C13B 20/14*    (2011.01)
*B01D 15/20*    (2006.01)
(Continued)

(52) U.S. Cl.
CPC .......... *C13B 20/14* (2013.01); *B01D 15/1885* (2013.01); *B01D 15/203* (2013.01);
(Continued)

(58) Field of Classification Search
CPC ....... C13B 20/14; C13B 20/146; C13B 20/16; B01J 47/10; B01J 49/05; B01J 20/30;
(Continued)

(56) References Cited

U.S. PATENT DOCUMENTS

| 2,563,006 A | 8/1951 | Collier |
| 2,891,007 A * | 6/1959 | Caskey .................... B01J 49/05 |
| | | 210/678 |

(Continued)

FOREIGN PATENT DOCUMENTS

| GB | 1 066 231 A | 4/1967 |
| GB | 2 221 696 A | 2/1990 |

(Continued)

OTHER PUBLICATIONS

International Search Report for International Application No. PCT/FR2017/053218, entitled "Purification Method Using a Low Granulometry Resin," consisting of 7 pages. dated Jun. 11, 2018.

(Continued)

*Primary Examiner* — Joseph W Drodge
(74) *Attorney, Agent, or Firm* — Hamilton, Brook, Smith & Reynolds, P.C.

(57) ABSTRACT

The invention relates to a method for purifying a solution, the method comprising the following successive steps: —bringing a solution to be purified into contact with an ion exchange resin by suspending the ion exchange resin in the solution to be purified, the ion exchange resin having the form of particles having a size Dv50 smaller than or equal to 200 μm; —separating the solution into a purified solution and a loaded resin; —regenerating the loaded resin by passing at least one regenerating solution through a compact bed of loaded resin. The invention also relates to an assembly for implementing the method.

16 Claims, 5 Drawing Sheets

(51) Int. Cl.
  *B01D 15/36* (2006.01)
  *B01D 15/18* (2006.01)
  *B01J 47/10* (2017.01)
  *B01J 49/05* (2017.01)
  *B01J 49/60* (2017.01)
  *C02F 1/44* (2006.01)

(52) U.S. Cl.
  CPC ......... *B01D 15/361* (2013.01); *B01D 15/363* (2013.01); *B01J 47/10* (2013.01); *B01J 49/05* (2017.01); *B01J 49/60* (2017.01); *C02F 1/44* (2013.01)

(58) Field of Classification Search
  CPC ...... B01J 20/34; B01J 20/3483; B01J 20/345; B01J 20/3458; B01J 20/3475; B01J 41/00; B01J 41/08; B01J 41/09; B01J 47/016; B01J 49/00; B01J 49/07; B01J 49/60; B01D 15/1885; B01D 15/361; B01D 15/203; B01D 15/363; B01D 15/00; B01D 24/46; B01D 36/00; B01D 41/03; B01D 61/04; B01D 61/142; B01D 61/146; B01D 61/20; B01D 61/58; B01D 2311/2634; B01D 2311/2642; B01D 2311/2649; B01D 2311/2653; C02F 1/24; C02F 1/44; C02F 1/441; C02F 1/66; C02F 1/72; C02F 2103/26; C02F 2103/32; C02F 2209/02; C02F 2209/06; C02F 2303/16
  USPC ....... 127/9, 46.2, 46.3; 210/198.1, 638, 670, 210/673, 675, 702, 703, 737, 758, 806
  See application file for complete search history.

(56) References Cited

U.S. PATENT DOCUMENTS

| | | | | |
|---|---|---|---|---|
| 3,382,169 A | * | 5/1968 | Thompson | B01J 41/05 210/673 |
| 3,429,807 A | * | 2/1969 | Burgess | B01J 49/09 521/26 |
| 3,730,770 A | | 5/1973 | Zievers et al. | |
| 4,211,579 A | * | 7/1980 | Quentin | C13B 20/14 127/46.2 |
| 4,379,859 A | * | 4/1983 | Hirosawa | C08J 9/0061 521/59 |
| 4,421,864 A | * | 12/1983 | Watson, Sr. | B01J 49/00 521/26 |
| 4,693,818 A | * | 9/1987 | Terrien | B01J 47/10 210/189 |
| 4,968,353 A | * | 11/1990 | Kawasaki | C13B 20/123 127/46.2 |
| 5,022,997 A | * | 6/1991 | Salem | B01D 15/00 210/670 |
| 6,872,308 B1 | | 3/2005 | Bellows | |
| 9,682,371 B2 | * | 6/2017 | Baiada | C02F 9/00 |
| 2002/0166817 A1 | * | 11/2002 | Gruett | B01J 49/05 210/670 |
| 2010/0160684 A1 | * | 6/2010 | Deavenport | C07C 213/04 564/292 |
| 2015/0096940 A1 | * | 4/2015 | Arias-Paic | C02F 1/42 210/677 |

FOREIGN PATENT DOCUMENTS

| | | |
|---|---|---|
| JP | S 60106540 A | 6/1985 |
| WO | 20050001145 A1 | 1/2005 |

OTHER PUBLICATIONS

Yarnell, P.A., "Powdered Resins : Continuous Ion Exchange," dans Encyclopedia of Separation Science (Elsevier Science Ltd.)—p. 3973-3981 (2000).

Cane Sugar Refining with Ion Exchange Resins-Purolite retrieved from www.purolite.com, consisting of 52 pages (2009).

RPF Rotary Pressure Filter—BHS Sonthofen retrieved from www.bhs-sonthofen.com, consisting of 16 pages (2015).

\* cited by examiner

PURIFICATION METHOD USING A LOW GRANULOMETRY RESIN

This application is the U.S. National Stage of International Application No. PCT/FR2017/053218, filed Nov. 22, 2017, which designates the U.S., published in French and claims priority under 35 U.S.C. § 119 or 365(c) to French Application No. 1661476, filed Nov. 24, 2016. The entire teachings of the above applications are incorporated herein by reference.

FIELD OF THE INVENTION

The present invention relates to a method for purifying a solution, and in particular for decolourizing a sugar liquor using an ion exchange resin of small particle size.

TECHNICAL BACKGROUND

The sugar industry produces sugar juice or sugar liquor which comprises impurities and notably colourants. The sugar liquor must therefore undergo a purification, and notably a decolourization.

One conventional decolourization method is to pass the sugar liquor through a chromatographic system packed with an ion exchange resin. The resin used generally has a mean particle size of about 700 μm, and allows a decolourization level of about 65% to be obtained, equivalent to colour fixation between 15 and 18×10$^6$ ICUMSA units per litre of resin at a percolation rate of about 10 m/h.

Resins of smaller particle size are commercially available e.g. the PRA420 resin by Purolite. Said, resins, generally sensitive and costly, are reserved for decolourizing scarcely coloured liquors (between 0 and 100 ICUMSA units). It would be difficult to use these in conventional chromatographic systems notably due to the operating pressures which would be required.

The article Powdered Resins: Continuous Ion Exchange, by P. A. Yarnell, in Encyclopedia of Separation Science (Elsevier Science Ltd., 2000) p. 3973-3981 describes the use of ground resin of small particle size to form a thin layer pre-coat on filters for various applications including the decolourization of sugar liquors. After use, the material is discarded. This technique therefore implies high consumption of resin.

Document JP S60-106540 describes a method for decolourizing sugar liquor by contacting it with an anionic resin. The resin is ground to a particle size of less than 250 μm. Contacting is performed by suspending the resin in the liquor to be treated and by stirring. The document also provides for regenerating the resin loaded with colourants so that it can be reused by resuspension in a regenerating solution. However, the quantities of regenerant used are very high.

Document GB 2221696 describes a method for decolourizing sugar liquor based on the use of cristobalite, with a finishing step by contacting with an ion exchange resin. Example 6 of the document mentions a resin having a particle size of less than 50 μm, which is put in contact with a pre-treated liquor by suspension and stirring. The same remarks apply as to the preceding documents.

Document U.S. Pat. No. 6,872,308 describes the use of an ion exchange resin column, followed by a filter comprising a pre-layer of resin powder, in the field of condensate treatment.

There is a need for the provision of a solution purification method, and notably for decolourizing sugar liquor, that is more efficient than those in the prior art, wherein the resin is regenerated without excessive consumption of regenerating solution.

SUMMARY OF THE INVENTION

The invention first relates to a method for purifying a solution, successively comprising:
  contacting a solution to be purified with an ion exchange resin, by putting the ion exchange resin in suspension in the solution to be purified, the ion exchange resin being in the form of particles having a Dv50 size equal to or less than 200 μm;
  separating a purified solution on the one hand and a loaded resin on the other hand;
  regenerating the loaded resin, by passing at least one regenerating solution through a compact bed of loaded resin.

In one embodiment, the method is a decolourizing method, the solution to be purified preferably being a sugar liquor; and the sugar liquor more particularly having a colouring equal to or higher than 100 ICUMSA units, preferably 300 ICUMSA units, preferably 400 ICUMSA units and particularly preferred 500 ICUMSA units.

In one embodiment the method, before regeneration of the loaded resin, further comprises:
  washing the loaded resin, preferably by passing at least one washing solution through a compact bed of loaded resin;
  and preferably, at the time of or after the washing, comprises:
  separating the loaded resin and an additional dilute fraction of purified solution.

In one embodiment, the method further comprises:
  rinsing the resin after regeneration, preferably by passing at least one rinsing solution through a compact bed of resin.

In one embodiment, the method further comprises:
  removing filter cake from the compact bed of resin after washing, or regenerating or rinsing, and preferably after rinsing;
  the filter cake removal optionally being performed by a flow of solution to be purified.

In one embodiment, the suspension of the ion exchange resin in the solution to be purified is carried out in an agitated vessel.

In one embodiment, the separation of the purified solution, the regeneration of the loaded resin, and optionally washing and/or rinsing of the resin are performed by means of one or more filters, the resin being retained in the form of a compact bed on these filters.

In one embodiment, the filters are arranged at the outlet of a container used for the contacting step and which is preferably the vessel under agitation mentioned above; or the filters are arranged in a filtering device separate from said vessel and preferably connected thereto, the separate filtering device preferably being selected from rotary press filters, rotary vacuum filters and belt filters.

In one embodiment, the ion exchange resin is in the form of particles having a Dv50 size equal to or less than 150 μm, preferably 100 μm, and more particularly preferred 50 μm.

In one embodiment, the maximum size of the compact bed of loaded resin in the direction in which the regenerating solution is passed is equal to or less than 10 cm, preferably equal to or less than 5 cm, more particularly preferred equal to or less than 2 cm.

In one embodiment:
the regenerating solution used to regenerate the loaded resin is partly derived from a preceding regeneration of the loaded resin; and/or
the washing solution used to wash the loaded resin is partly derived from a preceding wash of the loaded resin, and/or a preceding regeneration of the loaded resin; and/or
the rinsing solution used to rinse the resin is partly derived from a previous rinsing of the resin.

In one embodiment the method is continuous.

In one embodiment, a plurality of batches of loaded resin derived from several separate contacting steps are grouped together in a single batch of loaded resin for the implementation of the regeneration step, and optionally the preceding wash step and/or the following rinse step.

A further subject of the invention is an assembly for the purification of a solution to be purified, comprising:
an ion exchange resin in the form of particles having a Dv50 size equal to or less than 200 μm;
an installation for purifying a solution to be purified, comprising:
a container to put the resin in suspension in the solution to be purified;
a separating device to separate a purified solution on the one hand and a loaded resin on the other hand;
the installation being configured to regenerate the loaded resin by passing at least one regenerating solution through a compact bed of loaded resin.

In one embodiment, the installation is also configured to rinse the resin after regeneration thereof, preferably by passing at least one rinsing solution through a compact bed of resin; and/or to wash the resin before regeneration thereof, preferably by passing at least one washing solution through a compact bed of resin.

In one embodiment, the installation is also configured to carry out the removal of filter cake from the compact bed of resin, after regeneration and optional rinsing.

In one embodiment, the container is an agitated vessel.

In one embodiment, the separating device is configured to form a compact bed of resin on one or more filters; and preferably:
the filters are arranged at the outlet of the container; or
the filters are arranged in a filtering device separate from the container and preferably connected thereto, the filtering device preferably being a rotary press filter, rotary vacuum filter or belt filter.

In one embodiment, the ion exchange resin is in the form of particles having a Dv50 size equal to or less than 150 μm, preferably 100 μm, more particularly preferred 50 μm.

In one embodiment, the maximum size of the compact bed of loaded resin in the direction in which the regenerating solution is passed is equal to or less than 10 cm, preferably equal to or less than 5 cm, more particularly preferred equal to or less than 2 cm.

The present invention allows overcoming of the disadvantages in the prior art. More particularly, it provides a method for decolourizing a sugar liquor that is more efficient than those in the prior art, in which the resin is regenerated without excessive consumption of regenerating solution. The method is particularly applicable to sugar liquors having relatively high colouring.

In one embodiment, this is notably achieved due to the combination of three characteristics:
(1) on the one hand, the use of an ion exchange resin of small particle size;
(2) on the other hand, the use of this ion exchange resin in the form of a suspension during the contacting step of the sugar liquor with the resin;
(3) finally, the use of the resin in the form of a compact bed during the regeneration step of the resin.

Characteristic (1) allows a considerable improvement in resin capacity and capture kinetics of the coloured molecules, compared with the use of a conventional resin of larger particle size.

Characteristic (2) allows the disadvantages of using a resin of small particle size in a conventional chromatographic system such as a static column to be avoided, namely a reduction in percolation rate and hence reduced productivity, and/or the use of complex, costly high-pressure systems.

Characteristic (3) allows limiting of the amount of regenerating solution consumed to regenerate the resin.

DESCRIPTION OF EMBODIMENTS OF THE INVENTION

Figure 1:
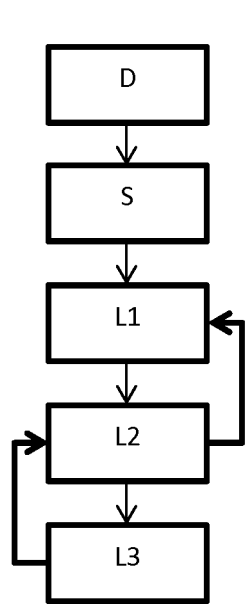
FIGS. 1 to 4 schematically illustrate successions of steps in some embodiments of the method of the invention.

A more detailed, nonlimiting description of the invention is given in the following.

The invention targets the purification of a solution i.e. reducing the content of one or more compounds present in this solution.

The compounds to be purified are preferably solution-containing molecules and have a molecular weight of more than or equal to 500 Da, preferably more than or equal to 750 Da, even more than or equal to 1 kDa.

Preferably the compounds to be purified are molecules having at least one aromatic ring or a chromophore group i.e. they are molecules comprising a sequence of conjugated double bonds (alternating double bonds and single bonds).

Preferably, the compounds to be purified are one or more colourants, in which case the purification method is a decolourizing method.

Preferably the solution to be purified is a sugar liquor.

The compounds to be purified can notably include flavonoids, melanins, des carotenes, chlorophylls, xanthophylls, melanoidins, caramels, HADPs (hexose alkaline-degradation products), and combinations thereof.

In the following, the invention is described with reference to the preferred embodiment of decolourizing sugar liquor, for better clarity. However this description similarly applies to another type of solution purification. For example, the solution may not be a sugar liquor. In addition, the compounds to be purified may not only be colourants but also enzymes or polymers for example.

It is to be understood that, depending on cases, the compounds to be purified are either impurities to be removed or compounds of interest that it is useful to collect and recover for reuse.

As mentioned above, the method of the invention preferably consists of decolourizing a sugar liquor. By «sugar liquor» is meant a liquid flow containing sugars and impurities, and notably molecules of colourants. The sugar liquor is advantageously derived from the sugar industry. It may have been subjected to one or more pre-treatment steps such as centrifugation, filtration, carbonatation, flotation and/or clarification steps.

By «decolourization» is meant the reduction in the colouring of the sugar liquor, measured in ICUMSA units. The method for colour determination derives from official ICUMSA methods adapted to brown sugar: GS1/3-7 (2011) and white sugar: GS2/3-10 (2011)—depending on the origin and nature of the sugar liquor.

Advantageously, the sugar liquor to which the method of the invention is applied has a colouring of higher than or equal to 100 IU (ICUMSA units), preferably 300 IU, more preferably 400 IU, and particularly preferred 500 IU.

Further advantageously, the decolourized sugar liquor obtained with the method of the invention has a colouring of less than or equal to 1000 IU, preferably less than or equal to 400 IU, more preferably less than or equal to 300 IU, more particularly less than or equal to 200 IU, and ideally less than or equal to 150 IU.

Advantageously, the decolourization rate of the sugar liquor (ratio between the colouring of the decolourized sugar liquor and the colouring of the sugar liquor before application of the decolourization method, the colourings being measured in IU) is equal to or higher than 30%, 40%, 50%, 60% or 70%.

According to the invention, the decolourization is performed by contacting the sugar liquor with an ion exchange resin. Preferably it is a strong anionic resin, in chloride and hydroxyl form, with a chloride/hydroxyl ratio preferably higher than 50%, more preferably higher than 60%, 70%, 80% or 90%.

Alternatively, it is possible to use a weak anionic resin, or a weak cationic resin, or a strong cationic resin, or an adsorbent resin or combinations thereof, or in a mixture with activated carbon.

Still according to the invention, the resin is in the form of particles having a Dv50 particle size of less than or equal to 200 μm.

The term Dv50 designates the 50th percentile of the particle distribution size i.e. 50% of particles have a size (corresponding to the diameter of the particles when spherical) smaller than Dv50 and 50% have a size larger than Dv50. It is the volume median distribution of the resin particles.

The value of Dv50 can be determined by laser diffraction granulometry.

In some cases, the individual particles may have a tendency to aggregate, in which case it is appropriate to determine their size by electron microscopy, since the apparent size measured by laser diffraction granulometry is then larger than actual particle size.

Preferably, the resin is in the form of particles having a Dv50 equal to or less than 150 μm, 100 μm, 75 μm, 50 μm, 40 μm, 30 μm, 20 μm or 10 μm.

If it is not desired to determine in a very exact manner the Dv50, it is possible to estimate a size range within which the Dv50 is included, by sieving. For example, if the particles mostly pass through a mesh of 100 μm opening, this means that the Dv50 of the particles is less than 100 μm. The sieving method also allows selection of particles having a Dv50 comprised between two thresholds (lower and upper).

A resin of suitable particle size may be directly available commercially, or it can be obtained from a commercial resin of larger particle size by grinding. Grinding of resin beads can be carried out by cryogenics, mechanical action (worm screw), pulsed air or any other method known to the skilled person. It can also be adjusted by sieving.

The contacting of the sugar liquor with the resin allows absorption of the colourant molecules on said resin.

According to the invention, the contacting of the sugar liquor with the resin is performed by putting the resin in suspension in the sugar liquor. In other words, the resin is in a non-compact state.

Throughout this application, the «compact» state is defined as being a state in which the particles are in permanent or near-permanent contact with neighbouring particles. Preferably, a resin bed in the compact state is a resin bed which, without taking into account any possible supernatant, contains less than 2 volumes of interstitial liquid per 1 volume of dry resin bed, more preferably less than 1.5 or less than 1 or less than 0.9 volume of interstitial liquid per 1 volume of dry resin bed. The «dry resin bed» is obtained by removing the interstitial liquid from the resin bed in the compact state, for example by blowing or other equivalent drying procedure.

Preferably, the volume fraction occupied by the particles (in the non-compact state) during the contacting step with the sugar liquor (corresponding to the concentration of the starting or commercially supplied resin in the sugar liquor, expressed as a volume ratio) is less than or equal to 0.3, preferably 0.2, 0.1, 0.5, 0.01, or 0.005.

The suspension of the resin in the sugar liquor can be carried out by mixing the resin with the sugar liquor in an agitated vessel. Preferably, the vessel is therefore equipped with one or more agitators but any other suitable agitation means known to the skilled person can be used e.g. external recirculation or any other flow of liquid. The vessel under agitation can be a fluidized bed reactor for example.

The duration of this contacting step can be from 1 minute to 6 hours, preferably from 10 minutes to 2 hours. For example, the duration of the contacting step can be from 1 minute to 3 hours, preferably from 10 minutes to 1 hour.

The temperature applied during the contacting step of the sugar liquor with the resin can be from 10 to 95° C., preferably from 20 to 85° C., more particularly from 40 to 80° C., and further preferably from 50 to 70° C.

After the contacting step, the loaded resin (i.e. the resin containing adsorbed colourants) must be separated from the decolourized sugar liquor.

This separation is advantageously performed via filtration. Therefore, the mixture of liquor and resin is applied to at least one filter as described below in more detail in connection with the installations illustrated in the Figures. Alternatively, and preferably, the separation is performed on a rotary press filter or rotary vacuum filter or belt filter.

Such equipment has the advantage of being able to be fed from the part of the installation in which the contacting of the resin with the sugar liquor takes place. Reciprocally, it can feed that part of the installation in which the contacting of the resin with the sugar liquor takes place, for reuse of the resin. To limit the size of filtering devices, such equipment can advantageously operate in continuous mode. To maximise the general flexibility of the installation, it is also possible to contemplate a batch operation e.g. by accumulating the colourant-loaded resin on a filter before proceeding with the wash and regeneration steps at controlled frequency e.g. in time or per resin volume.

More specifically, the above filtering devices can have several compartments e.g. one for separation, one for washing, one for regeneration and one for rinsing. In a device of belt filter type, the travel of the belt ensures passing of the resin from one compartment to another; in a rotary filter device, the effect of rotation can ensure the passing of the resin from one compartment to another e.g. with injections of different fluids between the compartments.

It is also recommended to prefilter the resin e.g. via membrane filtration.

In general, the resin particles are retained on the filter(s) and a concentrated fraction of decolourized sugar liquor is collected through the filter(s). Alternatively, other liquid-solid separation methods can be employed such as centrifugation or decantation.

After this separation, the resin is generally in a compact state, and there generally remains decolourized sugar liquor in the interstitial spaces between the resin particles. This is why it is advantageous to carry out a wash step.

At the wash step, a washing solution preferably water is added to the resin then separated, advantageously via filtration. The resin can be resuspended in the washing solution before proceeding with filtration. Alternatively, it is possible to pass the washing solution directly through the compact bed of resin retained on the filter(s) for example.

The decolourized sugar liquor recovered after the separation step (before washing) forms a concentrated fraction. At the time of, or after the wash step, it is also possible to collect a dilute fraction of decolourized sugar liquor.

The dilute fraction of decolourized sugar liquor and the concentrated fraction of decolourized sugar liquor can be mixed together, or treated and reused separately.

In some cases, it is desirable to use two or more successive washings, the washing solutions possibly being the same or different.

The washing solutions can themselves originate in whole or in part from a preceding wash step, by recycling.

For example, when one same device is used for several separation cycles spread over time, each cycle comprising at least two successive washes, the wash solution collected after the second washing can be used to carry out the first washing for the next cycle; and more generally, the wash solution collected after the N+1$^{st}$ wash can be used to carry out the N$^{th}$ wash at the following cycle. This configuration is schematically illustrated in FIG. 1 showing a sequence of a decolourizing step D, separation step S, followed by three successive washes L1, L2 and L3. The wash solution collected after wash L2 is recycled to carry out wash L1 at the following cycle, and the wash solution collected after wash L3 is recycled to carry out wash L2 at the following cycle.

Figure 3:
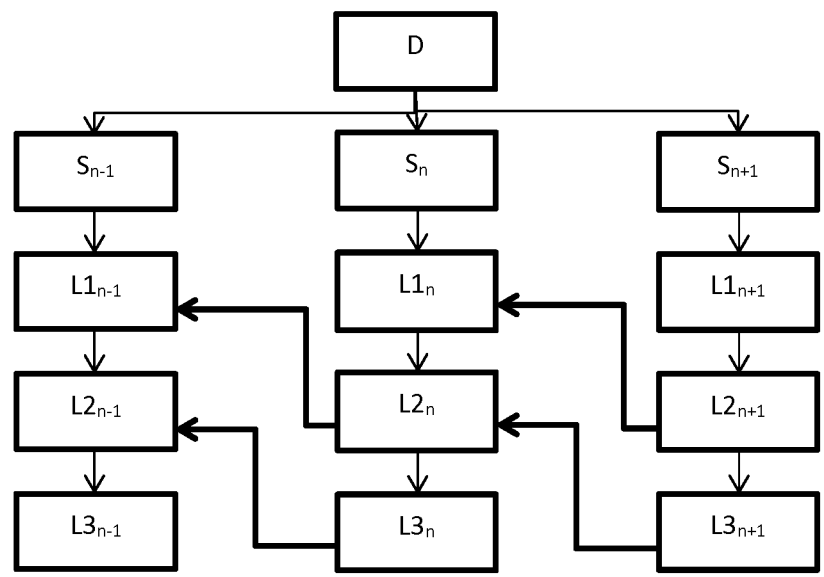

Alternatively, when several devices are used in parallel, and at least two successive washes are planned in each device, the wash solution collected in one device after the second washing can be used to carry out the first washing in another device; and more generally the wash solution collected in one device after the N+1$^{st}$ wash can be used to carry out the N$^{th}$ wash in another device. This configuration is illustrated schematically in FIG. 3, showing a sequence of a decolourization step D, then separation step S, followed by three successive washes L1, L2 and L3, the separation and washes being conducted in a plurality of devices arranged in parallel (three being shown here and designated by their subscripts). The wash solution recovered after washing L2$_n$ (wash L2 in device n) is recycled to conduct washing L1$_{n-1}$ (wash L1 in another device n−1), and the wash solution recovered after washing L3$_n$ (wash L3 in device n) is recycled to conduct washing L2$_{n-1}$ (wash L2 in another device n−1).

After the wash(es), there generally remains washing solution in the interstitial spaces between the resin particles. This is why it is advantageous to conduct a step to remove the residual washing solution using any means known to skilled persons, such as vacuum aspiration or blowing with a stream of gas such as air or nitrogen.

The invention next provides for a regeneration step of the loaded resin.

With this step, it is possible to remove all or part of the colourant molecules adsorbed on the resin, to allow reuse of the latter. To do so, the resin is placed in contact with at least one regenerating solution.

In some cases, it is desirable to use two or more successive regeneration steps, the regenerating solutions possibly being the same or different.

The regenerating solutions can themselves derive from all or part of a preceding regeneration step, via recycling. Alternatively, or in combination, one or more wash solutions such as previously described can themselves derive from all or part of a preceding regeneration step, via recycling.

Figure 2:
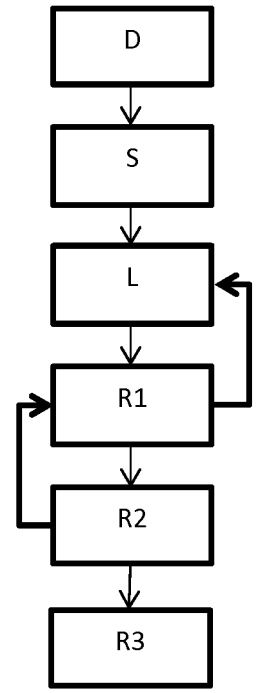

For example, when one same device is used for several separation cycles spread over time, each cycle comprising at least two successive regeneration steps, the regenerating solution collected after the second regeneration can be used to conduct the first regeneration at the following cycle; and more generally, the regenerating solution collected after the N+1$^{th}$ regeneration step can be used to conduct the N$^{th}$ regeneration step at the following cycle. This configuration is schematically illustrated in FIG. 2 showing a sequence of a decolourization step D, separation step S, one or more washes L, followed by three successive regeneration steps R1, R2 and R3. The regenerating solution recovered after regeneration step R2 is recycled to conduct regeneration step R1 at the following cycle, and the regenerating solution recovered after regeneration step R3 is recycled to conduct regeneration step R2 at the following cycle. In addition, the regenerating solution recovered after regeneration step R1 is recycled to carry out washing L.

Figure 4:
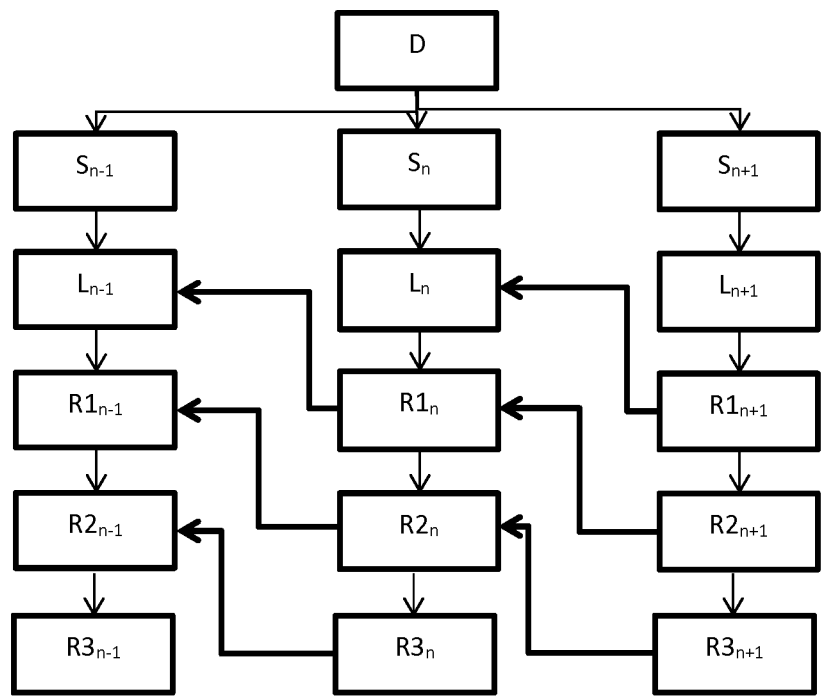

Alternatively, when several devices are used in parallel, and at least two successive regeneration steps are planned in each device, the regenerating solution collected in one device after the second regeneration step can be used to conduct the first regeneration step in another device; and more generally the regenerating solution collected in one device after the N+1$^{th}$ regeneration step can be used to conduct the $N^{th}$ regeneration step in another device. This configuration is schematically illustrated in FIG. 4 showing a sequence of a decolourization step D, separation step S, followed by one or more successive washes L, and three successive regeneration steps R1, R2, R3. Separation, washing and regeneration are performed in a plurality of devices arranged in parallel (three being shown here and designated by their subscripts). The regenerating solution recovered after regeneration step $R2_n$ (regeneration R2 in device n) is recycled to conduct regeneration step $R1_{n-1}$ (regeneration R1 in another device n−1), and the regenerating solution recovered after regeneration step $R3_n$ (regeneration R3 in device n) is recycled to conduct regeneration step $R2_{n-1}$ (regeneration R2 in another device n−1). Finally, the regenerating solution recovered after regeneration step $R1_n$ (regeneration R1 in device n) is recycled to conduct wash step $L_{n-1}$ (washing in another device n−1).

The regenerating solution(s) can be basic, acid and/or saline aqueous solutions, or organic solvents or hydro-organic mixtures, optionally basic and/or saline.

Preferably, an aqueous solution of basic sodium chloride is used, or basic brine. More preferably, it is the only regenerating solution used. The amount of NaCl (expressed in dry weight) preferably used is 90 to 270 g per litre of resin, preferably 120 to 230 g per litre of resin; and the amount of NaOH (expressed in dry weight) preferably used is 9 to 27 g per litre of resin, preferably 12 to 23 g per litre of resin.

The invention provides that regeneration of the resin is carried out by passing the (or each) regenerating solution through a compact bed of resin, i.e. a volume of resin in the compact state.

Preferably, the resin is retained on a filter or filters on which it forms a compact bed, and the regenerating solution passes through the bed of particles and the filter(s).

The total quantity of regenerating solution(s) used is preferably 0.5 to 4 times the volume of resin, and more particularly from 1 to 3 times the volume of resin, preferably 1 to 2 times the volume of resin.

Preferably, the volume ratio of amount of sugar liquor subjected to decolourization to the amount of regenerating solution(s) consumed is 10 or higher, more particularly equal to or higher than 20, 30, 40 or 50.

After the regeneration step, there generally remains regenerating solution in the interstitial spaces between the resin particles. This is why it is advantageous subsequently to carry out a rinsing and/or blowing step with a stream of gas (such as air or nitrogen) and/or vacuum aspiration to remove this residual regenerating solution. Blowing or aspiration are advantageously performed after rinsing.

At the rinsing step, a rinsing solution preferably water is added to the resin, then separated advantageously by filtration. The resin can be resuspended in the rinsing solution before carrying out the filtration. Alternatively, it is possible to pass the rinsing solution directly through the compact bed of resin retained on the filter(s).

Before reusing the resin for the contacting step with the sugar liquor, and hence for its resuspension, it is necessary to remove the filter cakes from the compact bed of resin after the regeneration step (and optionally blowing and/or rinsing and/or aspiration).

Filter cake removal can be obtained notably by injecting a liquid (preferably the sugar liquor itself) through the filter(s) in reverse direction to the direction used for the filtration; or else by a lateral injection of liquid; or more simply by mechanical scraping or vibratory action.

Preferably, the resin is resuspended and removal of filter cake is performed between the rinse step following regeneration and the following decolourization step. A resuspension, with filter cake removal, can also be performed during or between the steps of washing, rinsing and regeneration.

Preferably, one or more filters are used, preferably identical, to implement the steps of separating the decolourized sugar liquor from the resin, of optional washing, regeneration, and optional rinsing, the resin then being in the form of a compact bed on the filter(s).

Preferably, the height of the compact bed of resin i.e. the maximum dimension of the bed in a direction perpendicular to the surface of the filter (or each filter) is equal to or less than 10 cm, preferably equal to or less than 5 cm, more particularly preferred equal to or less than 2 cm. A low bed height allows limiting of the pressure required to pass the different liquids through the bed.

Figure 5:
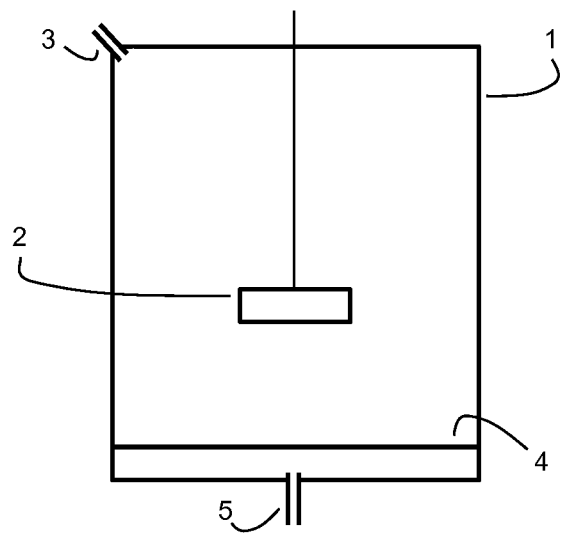
FIG. 5 schematically illustrates an installation adapted to implement the method of the invention, according to one embodiment.

With reference to FIG. 5, in one embodiment, an installation adapted to implement the method of the invention comprises:

a vessel 1;
one or more agitators 2;
at least one feed line 3, for example at (or close to) an upper end of the vessel 1;
a filter 4;
at least one offtake line 5, for example at (or close to) a lower end of the vessel 1.

The sugar liquor can be introduced into the vessel 1 when first loaded either via a feed line 3 or via an offtake line 5. Initial placing of the resin, when first loaded, in the vessel can be performed manually or via a feed line 3. The agitator(s) 2 allow the resin to be kept in suspension during the contacting step for the time needed to obtain the desired level of decolourization.

The decolourized sugar liquor can then be collected via an offtake line 5 by opening an appropriate valve. The resin is retained in the form of a compact bed on the filter 4. The height of the resin bed may vary over time. The decolourized sugar liquor can be forced through the compact bed either by placing the vessel 1 under pressure (therefore, a feed line 3 can be a gas feed line, notably of air under pressure); or by depressurizing an offtake line 5. It is possible, initially, to provide recirculation of the decolourized sugar liquor to form the compact bed of resin and allow clarifying of the sugar liquor.

The steps of washing, regeneration and rinsing can be conducted in the same manner, by injecting the different appropriate solutions either via a feed line 3 or preferably via nozzles distributed above the top surface of the resin bed.

The filter cake removal step is preferably performed by injecting the sugar liquor into the vessel 1 via an offtake line 5; it is also possible to consider mechanical action, for example using a worm-screw scraper system.

Figure 6:
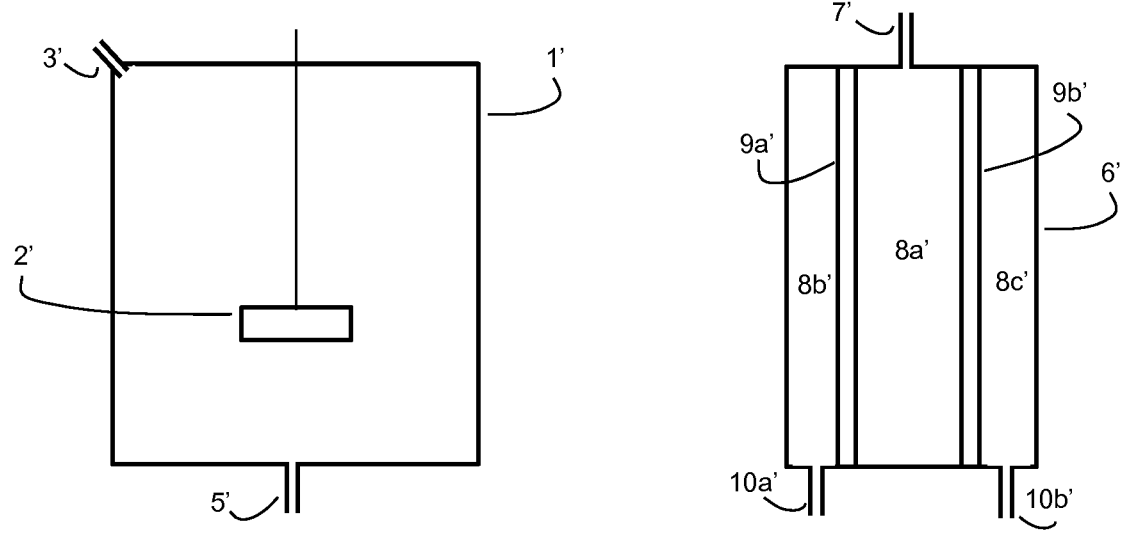
FIG. 6 schematically illustrates an installation adapted to implement the method of the invention, according to another embodiment.

With reference to FIG. 6, in another embodiment, an installation adapted to implement the method of the invention comprises:

a vessel 1' provided with one or more agitators 2';
at least one feed line 3' connected to the vessel 1', for example at (or close to) an upper end of the vessel 1';
at least one offtake line 5' connected to the vessel 1', for example at (or close to) a lower end of the vessel 1';
a filtering device 6' separate from the vessel 1', comprising a first compartment 8a' (in the illustrated example in central position), a second compartment 8b' and a third compartment 8c' (in the illustrated example at either side of the first compartment 8a'), with a first filter 9a' between the first compartment 8a' and the second compartment 8b', and a second filter 9b' between the first compartment 8a' and the third compartment 8c';

at least one feed line 7' connected to the filtering device 6', and more specifically to the first compartment 8a';

at least one first offtake line 10a' and second offtake line 10b' connected to the filtering device 6', and more specifically to the second compartment 8b' and third compartment 8c' respectively.

The contacting step of the sugar liquor with the resin is conducted in the vessel 1', the resin being held in suspension in the sugar liquor by means of the agitator(s) 2', during the time needed to obtain the desired level of decolourization.

The liquor and resin are then withdrawn via the offtake line 5' and transferred towards the filtering device 6', and more specifically the first compartment thereof 8a'. Advantageously, the offtake line 5' can be directly connected to the feed line 7' of the filtering device 6', a pump possibly being provided to allow transfer of matter from the vessel 1' to the filtering device 6'.

Once the mixture of decolourized sugar liquor and resin are in the first compartment 8a', separation can be initiated by applying pressure in the feed line 7' of the filtering device 6' or depressurization in either one of the offtake lines 10a' and 10b' connected to the filtering device, or both. Therefore, the decolourized sugar liquor is collected by either one of the offtake lines 10a' and 10b' connected to the filtering device 6', or both, while the resin is retained on one or the other of the first filter 9a' and second filter 9b' (or both) in the form of a compact bed. Advantageously, the decolorized sugar liquor is collected by both lines and the volume of resin is such that the compact bed of resin occupies the entirety or near-entirety of the space between the first filter 9a' and second filter 9b'.

The steps of washing, regeneration and rinsing can then be carried out by injecting washing, regenerating and rinsing solutions respectively into the second compartment 8b' via the first offtake line 10a' of the filtering device 6', so as to pass the respective solutions through the first filter 9a' into the first compartment 8a', then through the second filter 9b' and into the third compartment 8c', the solutions being collected by the second offtake line 10b' of the filtering device 6'. At this stage, the resin is still in the form of a compact bed between the first filter 9a' and second filter 9b'.

Evidently, and alternatively, the circulation of fluids can be performed in reverse direction, from the second offtake line 10b' of the filtering device 6' towards the first offtake line 10a' of the filtering device 6'.

Filter cake removal from the resin can be carried out for example by injecting a liquid, preferably sugar liquor to be treated, preferably via the first offtake line 10a' of the filtering device 6' or via the second offtake line 10b' of the filtering device 6', or more preferably via both. The injection can also be supplemented by one or more injection points located between the first filter 9a' and second filter 9b'.

The resin can therefore be resuspended in the sugar liquor to be decolourized and again transferred to the vessel 1' via a feed line 3' or an offtake line 5'.

Alternatively, it is possible to use a filtering device 6' comprising a single filter instead of two.

Figure 7:
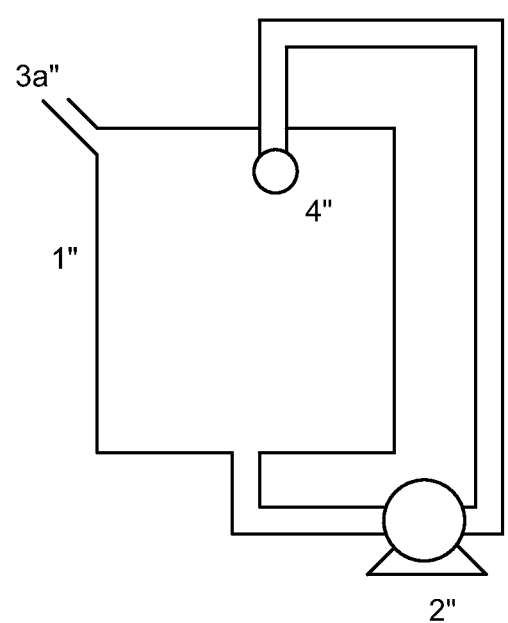
FIG. 7 schematically illustrates an agitated vessel used in an installation adapted to implement the method of the invention, according to another embodiment.

With reference to FIG. 7, in another embodiment, the installation may comprise a vessel 1" (instead of the vessel described above) provided with a feed line 3a" and a recirculation line 2" provided with a pump, ensuring stirring of the medium in the vessel 1". A spray head 4" can be provided for the input of fluid into the vessel 1" arriving from the recirculation line 2", to homogenize the medium. The spray head 4" can be a rotary head for example. An offtake line, not illustrated, is also provided. For example, this may be a branch of the recirculation line 2" so that the same pump can be used for stirring the medium in the vessel and for the withdrawal of the sugar liquor and the resin.

Figure 8:
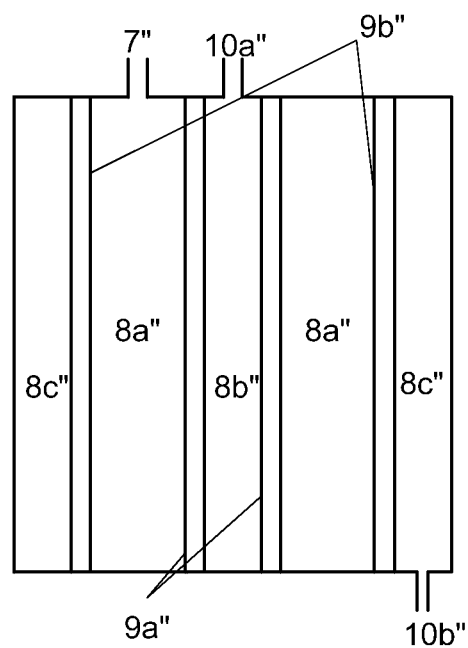
FIG. 8 schematically illustrates a filtering device used in an installation adapted to implement the method of the invention, according to another embodiment.

With reference to FIG. 8, in another embodiment, the installation may comprise a filtering device of cylindrical type comprising a first compartment 8a" on the periphery of a second compartment 8b", and a third compartment 8c" on the periphery of the first compartment 8a". A first filter 9a" is arranged between the first compartment 8a" and the second compartment 8b", and a second filter 9b" is arranged between the first compartment 8a" and the third compartment 8c".

A feed line 7" is connected to the filtering device at the first compartment 8a", and at least one first offtake line 10a" and a second offtake line 10b" are connected to the second compartment 8b" and third compartment 8c" respectively.

The operation of this filtering device can be similar to that described with reference to FIG. 6.

The vessel in FIG. 6 can be associated with the filtering device in FIG. 6 or with the one in FIG. 8. Alternatively, the vessel in FIG. 7 can be associated with the filtering device in FIG. 6 or the one in FIG. 8.

Alternatively, it is possible to use a filtering device such as a rotary press filter (e.g. those in the RPF range by BHS Sonthofen), a vacuum rotary filter or belt filter (e.g. those in the BF range by BHS Sonthofen).

EXAMPLES

The following examples are an unlimiting illustration of the invention. In all the examples, the characterization of particle Dv50 was obtained by sieving.

Example 1

In this example, a load of 100 BV (or resin bed volume equivalents) is used composed of a sugar liquor having 60% dry matter and a colouring of 545 ICUMSA units. The resin used is a strong anionic resin in chloride form (FPA90RF CI by Dow Chemical Company).

In test No 1, the raw resin of porosity comprised between 500 and 800 µm, is put in contact with the sugar liquor in a 400 mL beaker, thermostat-controlled at 60° C. and stirred with a magnetic stir bar.

In test No 2, the resin is previously ground down to a particle size of 100 to 500 µm. Contacting with the sugar liquor is carried out in the same manner as in test No 1.

In test No 3, the resin is previously ground down to a particle size of 80 to 100 µm. Contacting with the sugar liquor is carried out in the same manner as in test No 1.

In test No 4, the resin is previously ground down to a particle size of 35 to 80 µm. Contacting with the sugar liquor is carried out in the same manner as in test No 1.

Figure 9:
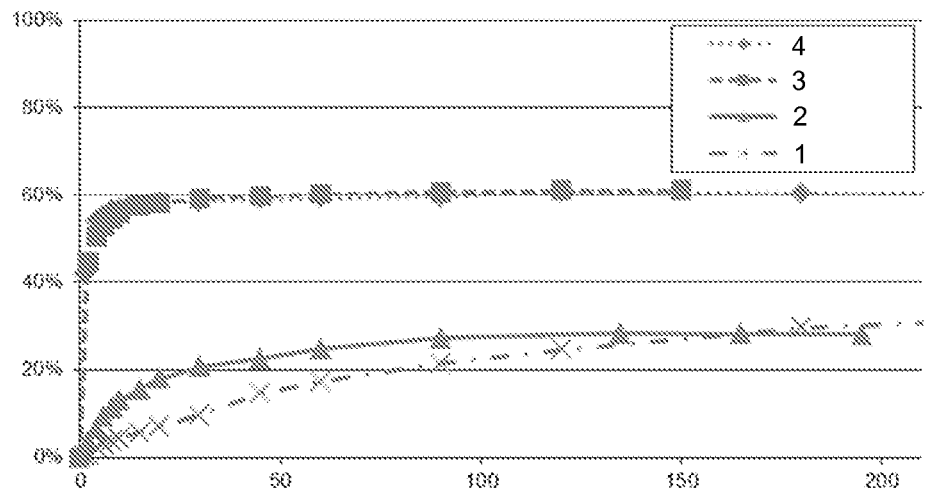
FIG. 9 illustrates the decolourizing kinetics of a sugar liquor with resins of different particle sizes, as described in example 1 below. The percentage of decolourization relative to the initial sugar liquor is given along the Y-axis, and the contact time in minutes is given along the X-axis.

The evolution in the colouring of the sugar liquor is measured by taking samples over time. The results are given in FIG. 9, each curve corresponding to one of the above tests as indicated in the boxed text.

In the light of these results, it can be inferred that the method for decolourizing sugar liquor is based on surface adsorption of the sugar molecules on the resin. The decrease in resin particle size increases accessible surface area, and thereby offers greater capacity and faster kinetics.

Example 2

In this example, a larger load is used than in Example 1, of 300 BV, composed of a sugar liquor having 60% dry matter and a colouring of 545 ICUMSA units. The resin used is the FPA90RF CI resin as in Example 1.

In test No 1, the raw resin of porosity comprised between 500 and 800 μm is put in contact with the sugar liquor in a 400 mL beaker, thermostat-controlled at 60° C. and stirred with a magnetic stir bar.

In test No 2, the resin is previously ground down to a particle size of 80 to 100 μm. Contacting with the sugar liquor is carried out in the same manner as in test No 1.

In test No 3, the resin is previously ground down to a particle size of 35 to 80 μm. Contacting with the sugar liquor is carried out in the same manner as in test No 1.

Figure 10:
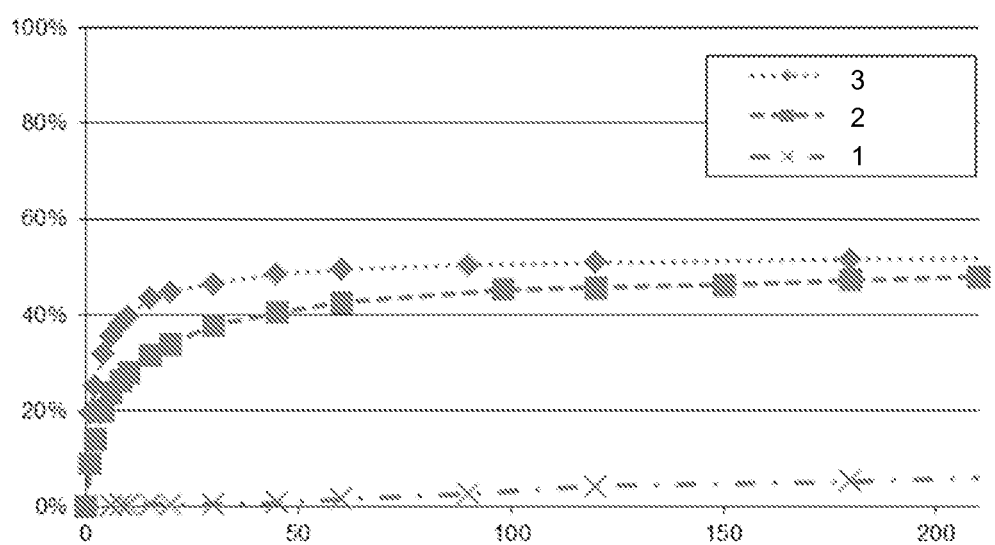
FIG. 10 illustrates the decolourizing kinetics of a sugar liquor with resins of different particle sizes, as described in example 2 below. The percentage of decolourization relative to the initial sugar liquor is given along the Y-axis, and the contact time in minutes is given along the X-axis.

The evolution in the colouring of the sugar liquor is measured by taking samples over time. The results are given in FIG. 10, each curve corresponding to one of the above tests as indicated in the boxed text.

In the light of these results, it is possible to obtain about 50% decolourization of a 300 BV load using a resin of small particle size, instead of less than 10% with a resin of conventional particle size.

These results confirm that the decolourization method corresponds to a surface adsorption mechanism. The decrease in particle size increases accessible surface area and thereby offers greater capacity and faster kinetics.

Decolourizing of a sugar liquor in a reactor under stirring is therefore rapid and gives good performance.

Example 3

In this example, tests are conducted on a chromatography column.

A column of diameter 1 cm and height of 4 cm is used—i.e. a resin volume of 3.14 mL. The adsorption step is performed by passing a volume of 180 BV of coloured sugar liquor through the resin bed (test No 1). The resin used is the resin of Example 1, ground to a particle size of 80-100 μm.

Figure 11:
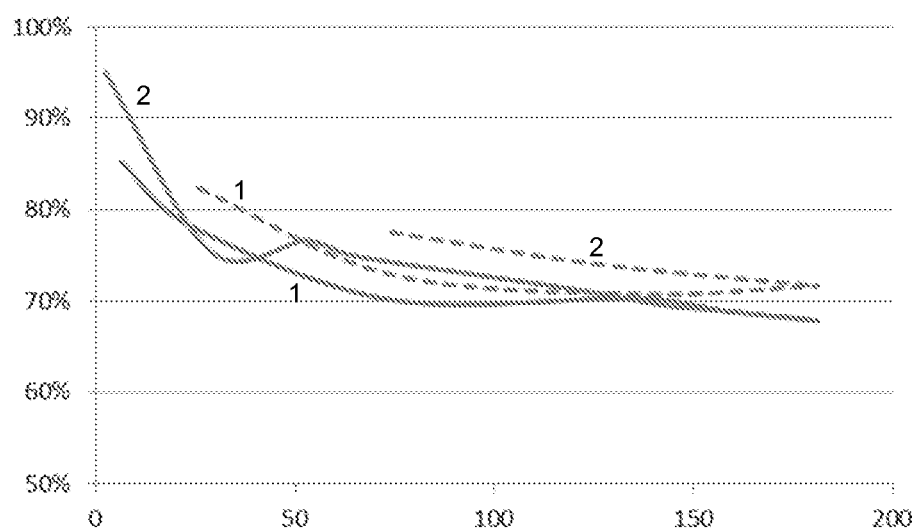
FIG. 11 illustrates the decolourization kinetics of a sugar liquor with resins of different particle sizes, as described in example 3 below. The percentage of decolourization relative to the initial sugar liquor is given along the Y-axis, and the load volume passed through the resin is given along the X-axis, in BV (resin bed volume equivalents).

The colouring of the decolourized sugar liquor is measured at the column outlet. The results are given in FIG. 11, curve No 1 in a solid line representing the instant rate of decolourization and curve No 1 in a dotted line representing the mean rate of decolourization.

After the adsorption step, a wash step is carried out by passing a 2 BV volume of water; then a regeneration step is carried out by passing a 1.8 BV volume of regenerating solution (10% NaCl+1% NaOH); and a rinse step was then applied with 5 BV of demineralized water. Each step lasts between 40 and 90 minutes.

Another adsorption is conducted under the same conditions as the first (test No 2). The colouring of the decolourized sugar liquor is again measured at the outlet of the column; and the results are given in FIG. 11, the solid line of curve No 2 representing the instant decolourization rate and the dotted line of curve no 2 representing the mean decolourization rate.

It is ascertained that the performance of both adsorptions is similar, demonstrating that even with strong saturation of adsorbed colourants the resin of small particle size is perfectly regenerated.

On the other hand, it was found that the head loss generated can exceed 10 bars at 0.5 m/h for sugar having 60% dry matter, which imposes a slow percolation rate and unfortunately largely increases the duration of the adsorption step. This is why the invention provides for performing the adsorption step with a suspension of resin in the sugar liquor, as in Examples 1 and 2.

The following table offers a comparison between the adsorption performance of Example 3 and adsorption performance in a conventional industrial installation.

|  | Conventional industrial installation | Example 3 |
| --- | --- | --- |
| Mean size (Dv50) of resin particles | 700 μm | 80-100 μm |
| Volume of sugar liquor | 52 BV | 180 BV |
| Input colouring of the sugar liquor | 500 ICUMSA units | 530 units ICUMSA |
| Output colouring of the sugar liquor | 175 ICUMSA units | 150 units ICUMSA |
| Content of soluble dry matter in sugar liquor | 65° Brix | 60° Brix |
| Colour fixation | 14.555 × 10$^6$ units ICUMSA/L resin | 52.942 × 10$^6$ units ICUMSA/L resin |
| Regeneration material consumed relative to volume of resin | 180 g NaCl at 100% + 18 g NaOH at 100% per L of resin | 180 g NaCl at 100% + 18 g NaOH at 100% per L of resin |
| Regeneration material consumed relative removed colouring | 12.37 g NaCl at 100% per 1 000 000 units ICUMSA + 1.24 g NaOH 100% | 3.40 g NaCl at 100% per 1 000 000 units ICUMSA + 0.34 g NaOH 100% |

The invention claimed is:

1. A method for purifying a solution, successively comprising:
    contacting a solution to be purified with an ion exchange resin, by putting the ion exchange resin in suspension in the solution to be purified for a duration of time, thereby forming a purified solution and a loaded ion exchange resin, the ion exchange resin being in the form of particles having a Dv50 size equal to or less than 200 μm;
    separating the purified solution from the loaded ion exchange resin, thereby forming a compact bed of loaded ion exchange resin; and
    regenerating the ion exchange resin from the compact bed of loaded ion exchange resin, by passing at least one regenerating solution through the compact bed of loaded ion exchange resin.

2. The method according to claim 1, wherein the solution to be purified being a sugar liquor, and wherein the method decolorizes the sugar liquor.

3. The method of claim 1 further comprising, before regenerating the ion exchange resin from the compact bed of loaded ion exchange resin:
    washing the loaded ion exchange resin, and/or,
    separating the loaded ion exchange resin and an additional dilute fraction of purified solution,
    wherein when both washing and separating the loaded ion exchange resin, separating the loaded ion exchange resin occurs at the time of, or after, washing the loaded ion exchange resin.

4. The method of claim 1, further comprising:
    rinsing the ion exchange resin after regenerating the ion exchange resin.

5. The method of claim 1, further comprising:
    removing filter cake from the compact bed of loaded ion exchange resin after washing, or regeneration or rinsing.

6. The method of claim 1, wherein suspension of the ion exchange resin in the solution to be purified is carried out in an agitated vessel.

7. The method of claim 1, wherein separating the purified solution, regenerating the ion exchange resin from the loaded ion exchange resin, and optionally washing and/or rinsing of the resin, are performed by means of one or more filters, the loaded ion exchange resin being retained in the form of a compact bed on the one or more filters.

8. The method according to claim 7, wherein the one or more filters are arranged at the outlet of a container used for the contacting step; or wherein the one or more filters are arranged in a filtering device separate from said container and connected thereto.

9. The method of claim 1, wherein the ion exchange resin is in the form of particles having a Dv50 size equal to or less than 150 µm.

10. The method of claim 1, wherein the compact bed of loaded ion exchange resin has a maximum size in a direction in which the regenerating solution is passed of equal to or less than 10 cm.

11. The method of claim 1, wherein:
the regenerating solution used to regenerate the ion exchange resin from the compact bed of loaded ion exchange resin is partly derived from a preceding regeneration of ion exchange resin from the compact bed of loaded ion exchange resin; and/or
a washing solution used to wash the loaded ion exchange resin is partly derived from a preceding washing of loaded ion exchange resin, and/or from a preceding regeneration of loaded ion exchange resin; and/or
a rinsing solution used to rinse the ion exchange resin is partly derived from a preceding rinsing of the ion exchange resin.

12. The method of claim 1, wherein the method operates continuously.

13. The method of claim 1, wherein a plurality of batches of loaded ion exchange resin are derived from a plurality of separate steps of contacting a solution to be purified with an ion exchange resin and are grouped together in a single batch of loaded ion exchange resin for the regenerating step, and optionally a preceding wash step and/or a following rinse step.

14. The method of claim 1, wherein the particles occupy a volume fraction during the contacting step with the solution to be purified which is equal to or less than 0.3.

15. The method of claim 1, wherein the ion exchange resin has a volume and wherein the total volume of the at least one regenerating solution used is from 0.5 to 4 times the volume of the ion exchange resin.

16. The method of claim 1, wherein the duration of contacting the ion exchange resin with the solution to be purified is from 1 minute to 6 hours.

* * * * *